US008063872B2

(12) United States Patent
Forstall et al.

(10) Patent No.: US 8,063,872 B2
(45) Date of Patent: Nov. 22, 2011

(54) PORTABLE ELECTRONIC DEVICE WITH AUTO-DIM TIMERS

(75) Inventors: Scott Forstall, Mountain View, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 974 days.

(21) Appl. No.: 11/960,677

(22) Filed: Dec. 19, 2007

(65) Prior Publication Data

US 2008/0218535 A1    Sep. 11, 2008

Related U.S. Application Data

(60) Provisional application No. 60/937,993, filed on Jun. 29, 2007, provisional application No. 60/879,469, filed on Jan. 8, 2007, provisional application No. 60/879,253, filed on Jan. 7, 2007, provisional application No. 60/883,821, filed on Jan. 7, 2007, provisional application No. 60/883,802, filed on Jan. 7, 2007.

(51) Int. Cl.
*G09G 3/36* (2006.01)
*G09G 5/00* (2006.01)
*G06F 3/038* (2006.01)
*G06F 1/26* (2006.01)
*G06F 1/00* (2006.01)

(52) U.S. Cl. ........ 345/102; 345/204; 345/211; 713/320; 713/322; 713/323

(58) Field of Classification Search .................. 345/102, 345/211; 713/320, 322
See application file for complete search history.

(56) References Cited

U.S. PATENT DOCUMENTS

| 6,516,421 B1 * | 2/2003 | Peters | 713/502 |
| 7,437,578 B2 * | 10/2008 | Menzl | 713/300 |
| 2006/0227125 A1 * | 10/2006 | Wong et al. | 345/211 |

* cited by examiner

*Primary Examiner* — Bipin Shalwala
*Assistant Examiner* — Ilana Spar
(74) *Attorney, Agent, or Firm* — Morgan, Lewis & Bockius LLP

(57) ABSTRACT

A portable electronic device with a touch-sensitive display is disclosed. In some embodiments, the time period after which the display is dimmed due to user inactivity is extended based on user interaction with the device subsequent to a dimming event. The dim time can be extended for a single application, multiple applications, or for the device as a whole. The user interaction with the device that extends the dim time can be a touch on any button of the device, the device's touch screen display, or even a smack on the body of the device that is detected by an acceleration sensor.

6 Claims, 17 Drawing Sheets

PORTABLE ELECTRONIC DEVICE WITH AUTO-DIM TIMERS

RELATED APPLICATIONS

This application claims priority to U.S. Provisional Patent Application Nos. 60/937,993, "Portable Multifunction Device," filed Jun. 29, 2007; 60/879,469, "Portable Multifunction Device," filed Jan. 8, 2007; 60/879,253, "Portable Multifunction Device," filed Jan. 7, 2007; 60/883,821, "Portable Electronic Device With Auto-Dim Timers," filed Jan. 7, 2007; and 60/883,802, "Portable Electronic Device with Alert Silencing," filed Jan. 7, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Patent Application No. 60/824,769, filed Sep. 6, 2006, entitled "Portable Multifunction Device." All of these applications are incorporated by reference herein in their entirety.

TECHNICAL FIELD

The disclosed embodiments relate generally to portable electronic devices, and more particularly, to portable devices that are capable of performing multiple functions, such as two or more of: telephoning, video conferencing, e-mailing, instant messaging, blogging, digital photographing, digital videoing, web browsing, digital music playing, and/or digital video playing.

BACKGROUND

As portable electronic devices become more compact, and the number of functions performed by a given device increase, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Portable electronic devices commonly provide a lighted display so users can interact with their applications and the device in bright daylight or at night. Because battery life is critical for portable devices, and because displays use much more power when lighted than when dimmed, portable devices commonly include a timeout feature wherein a lighted display is dimmed following a preset time period of user inactivity. For example the device display could be dimmed a minute after a user completes a call and subsequently does not interact with the device. This dimming feature can be annoying to users when the nature of their interaction with the device is periodic—in which situation they are required to continually interact with the device (e.g., touch the display or button) to relight the display. For example, consider the situation where a user watching a video on a portable device needs continually to touch the device to restore the screen's illumination. A user can increase the timeout period associated with display dimming, but this would have a deleterious effect on battery life and might not be appropriate in all situations.

Thus, there is a need for portable electronic devices that provide improved user interfaces and capabilities through which display dimming is managed.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. In some embodiments the device incorporates display dim timers and a display power management module that are responsive to user interaction with the device following a display dimming event. In such a situation, the display dim time is extended. The extended dim time can apply to one application, multiple applications, or the device as a whole. Instructions for performing these functions may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
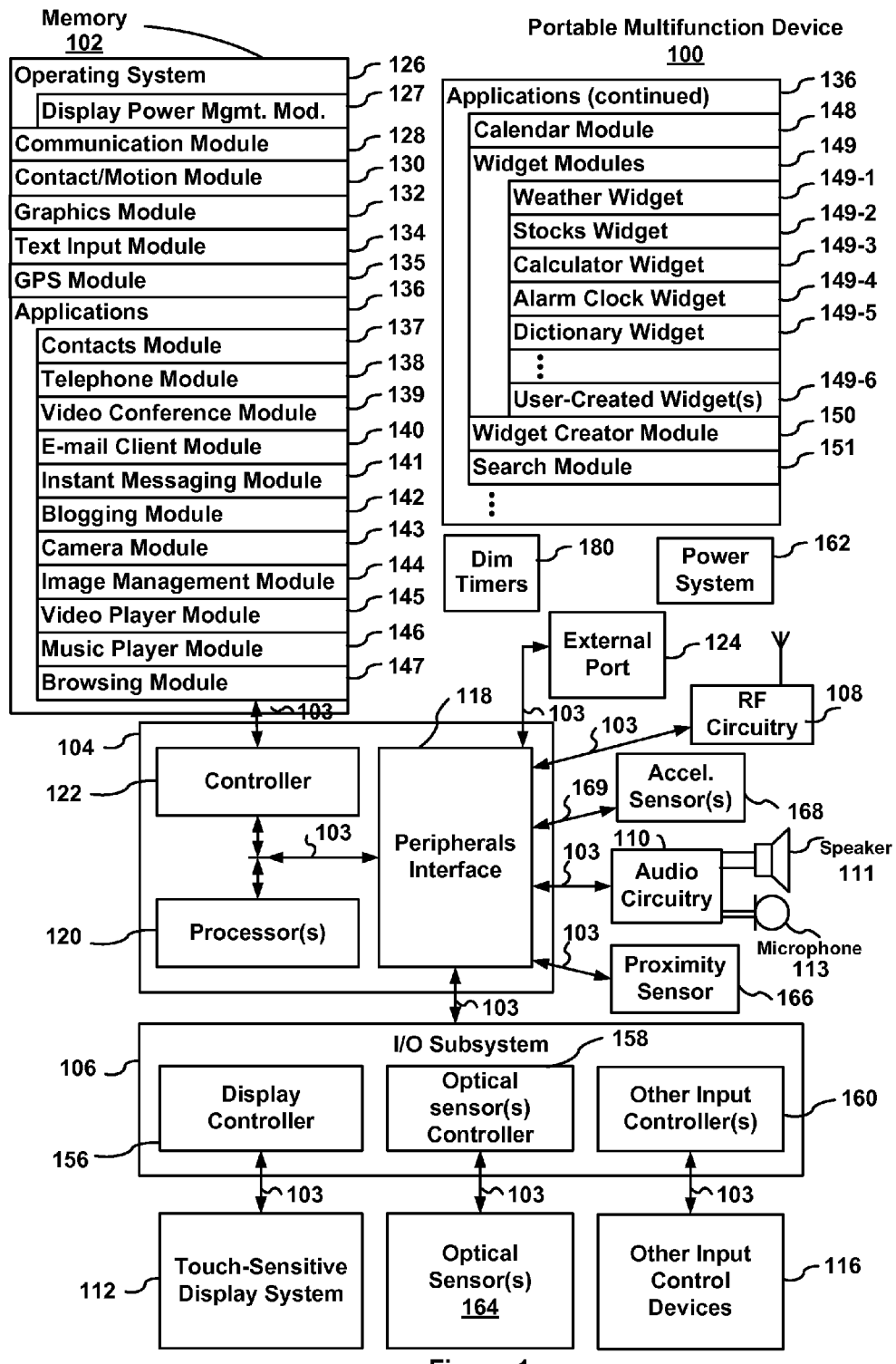
FIG. 1 is a block diagram illustrating a portable multifunction device with a touch-sensitive display and a display power management module with one or more dim timers in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164 and one or more dim timers 180. The dim timers can be implemented in hardware (with timer chips or circuitry) or can be implemented in software, in which case they rely on time counts maintained by a system clock. Whether implemented in hardware or software, the timers 180 are controlled by the display power management module 127, which is described below. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components.

The various components shown in FIG. 1 may be implemented in hardware, software or a combination of both hardware and software, including one or more signal processing and/or application specific integrated circuits.

Memory 102 includes one or more memory devices, each of which comprises or a plurality of which collectively comprise a computer readable storage medium. Memory 102 may include high-speed random access memory and may also include non-volatile memory, such as one or more magnetic disk storage devices, optical disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 1160 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570, 557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel. The click wheel may also be used to select one or more of the displayed icons. For example, the user may press down on at least a portion of the click wheel or an associated physical button. User commands and navigation commands provided by the user via the click wheel may be processed by an input controller 160 as well as one or more of the modules and/or sets of instructions in memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and 11/240,788, "Proximity Detector In Handheld Device," filed Sep. 30, 2005, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 also includes one or more acceleration sensors, or accelerometers, 168. The acceleration sensor(s) are responsive to accelerations experienced by the device 100 as a whole and generate one more signals 169 that encode the characteristics of such acceleration events. Some embodiments employ three acceleration sensors 168, each dedicated to sensing accelerations along a different normal axis of motion. Employing three such sensors in this configuration enables the detection of accelerations in any direction. Different types of acceleration sensors can be employed for this function as long as they generate a suitable output signal(s) 169 and be accommodated within the form factor of a portable electronic device 100. Types of acceleration sensors that can be used include MEMS ICs (micro-electromechanical system integrated circuits), variable capacitance sensors, piezoelectric sensors, piezoresistive sensors, or servo force balance (i.e., beam type) sensors. A more detailed discussion of acceleration sensors is provided in Applicant's U.S. Patent Publication No. 20050190059, entitled "Acceleration-based Theft Detection System for Portable Electronic Devices," which is incorporated herein by reference.

The above-referenced application ("Portable Electronic Device with Alert Silencing") describes how the acceleration sensor signal(s) 169 can be analyzed to determine, among other things, whether an acceleration event, or "shock", experienced by the device is due to a predetermined user gesture (e.g., a user "smack" on the device body). In the present application the terms "smack," "slap" and similar terms are used to denote quick contacts with, or blows to, the body of the device—typically delivered with a user's open hand, fingers or appropriate object—that produce a brief shock to the device 100 that is registered by the accelerometer 168, which outputs a corresponding, characteristic signal 169. One characteristic of such a slap or smack is that it can be registered by the accelerometer 168 when the device 100 is sitting on a solid surface, or even in the user's pocket, carrying case, bag, or backpack. The above-referenced application describes actions that can be taken by the device 100 in response to a smack, including, without limitation, silencing an audible alert or changing an alert mode. Some embodiments of the present invention can use the signals 169 from the accelerometer 168 to sense smacks or slaps on the body of the device that are delivered subsequent to a dimming event, in which case that information can trigger the display power management module to extend the dim for a single application (e.g., the application that was recently active), multiple applications (e.g., all applications with open windows), or all programs running on the device 100 that have dimmable displays. This feature would be of use when, for example, the user is using the device 100 in a darkened room and it might be preferable to smack the body of the device 100 after the display dims rather than touching the touch screen 112. Processing of the accelerometer signals can be implemented in the display power management module 127 or in an alert module 133, as described in the above-referenced application ("Portable Electronic Device with Alert Silencing").

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, an alert processing module 133 and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. In some embodiments, the operating system 126 includes a display power management module 127 that, among other tasks, manages display dimming in response to user inactivity (i.e., lack of interaction with the device 100). The display power management module 127 also manages the use of the dim timers 180 to extend display dim times in response to user interaction with the device 100 (typically just after a display dimming event), and can monitor status of the power system 162 (which may impact to what extent the display dim times can be extended). For example, if a dim time (also called an auto dim time) associated with a telephone application 138 executing on the device 100 is one minute and the user touches the display 112 shortly after the display was dimmed, then the display dim time would be extended to some reasonable value—two minutes, for example. The dim time is extended to reflect the fact that the user was probably interacting with the device to re-illuminate the display 112 after it was dimmed in accordance with the prior dim time setting. The extended display dim times can apply to one application (e.g., the application that was most recently active when the display was dimmed), multiple applications (e.g., the applications that were active when the display was dimmed) or the device 100 as a whole (e.g., all display functions of the device 100, including those associated with any of the applications 136). In some embodiments, or in some contexts, the extended display dim time is substantially double the prior display dim time. In various embodiments the extension of the display dim time is implemented by adding a specific amount of time (e.g., one minute) to the prior value of the display dim time, or by increasing the prior value of the display dim time by a specific percentage (e.g., 100 percent, 50 percent or 25 percent). The amount of the increase or extension may depend on the context, such as the power state of the device and whether the display dim time value has already been extended. By extending dim times in response to user interaction most likely intended to cause the display to be re-illuminated, the user's desire to have longer display illumination is honored. At the same time, unless there is such user input, the dim times would stay set to lower values, with the result of saving device power dedicated to the display 112.

In some embodiments, if the power status reported by the power system 162 indicates low power, the display power management module 127 can modify its behavior with respect to dim time management as follows: 1) it can not extend the dim time(s) for as long as it normally would (e.g., when the power system reports a low power condition, the amount of a dim time extension caused by a user action is reduced to a smaller value (e.g., 30 seconds) than a default dim time extension value (e.g., one minute)), 2) it can not extend the dim time(s) at all (e.g., when the power system reports a predefined low power condition, the dim time extension value is set to zero); or 3) it can lessen the dim time(s) settings for the device 100 and/or individual applications 136 (e.g., when the power system reports a predefined low power condition, the normal dim time for the device is reduced (e.g., from two minutes to 30 seconds) and the dim time is not extended in response to the predefined user actions that would otherwise result in a dim time extension). This behavior could be modified depending on the criticality of the low power status reported by the power system 162. For example, the display power management module might lessen the time dim time(s) even more in a more critical power situation than when power is merely low.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
 a contacts module 137 (sometimes called an address book or contact list);
 a telephone module 138;
 a video conferencing module 139;
 an e-mail client module 140;
 an instant messaging (IM) module 141;
 a blogging module 142;
 a camera module 143 for still and/or video images;
 an image management module 144;
 a video player module 145;
 a music player module 146;
 a browser module 147;
 a calendar module 148;
 widget modules 149, which may include weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6; and/or
 search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with the acceleration sensors 168, touch screen 112, display system controller 156, graphics module 132, text input module 134, dim timers 180 and power system 162, the display power management module 127 may be used to monitor and control auto-dimming of the touch screen 112 in response to a range of events, including, but not limited to, user inactivity with the device or an application(s) executing on the device, and user interaction with the device 100 subsequent to an auto dim event. The display power management module 132 can also be configured to define dim time settings for the device 100 as a whole and for specific application programs 136. The display power management module 127 is configured to interact with each of these other software modules and the operating system 126 to control and/or modify any of the respective module's program settings related to configuration of dim time settings and auto-dim implementation. This operation is further described in reference to FIG. 5.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
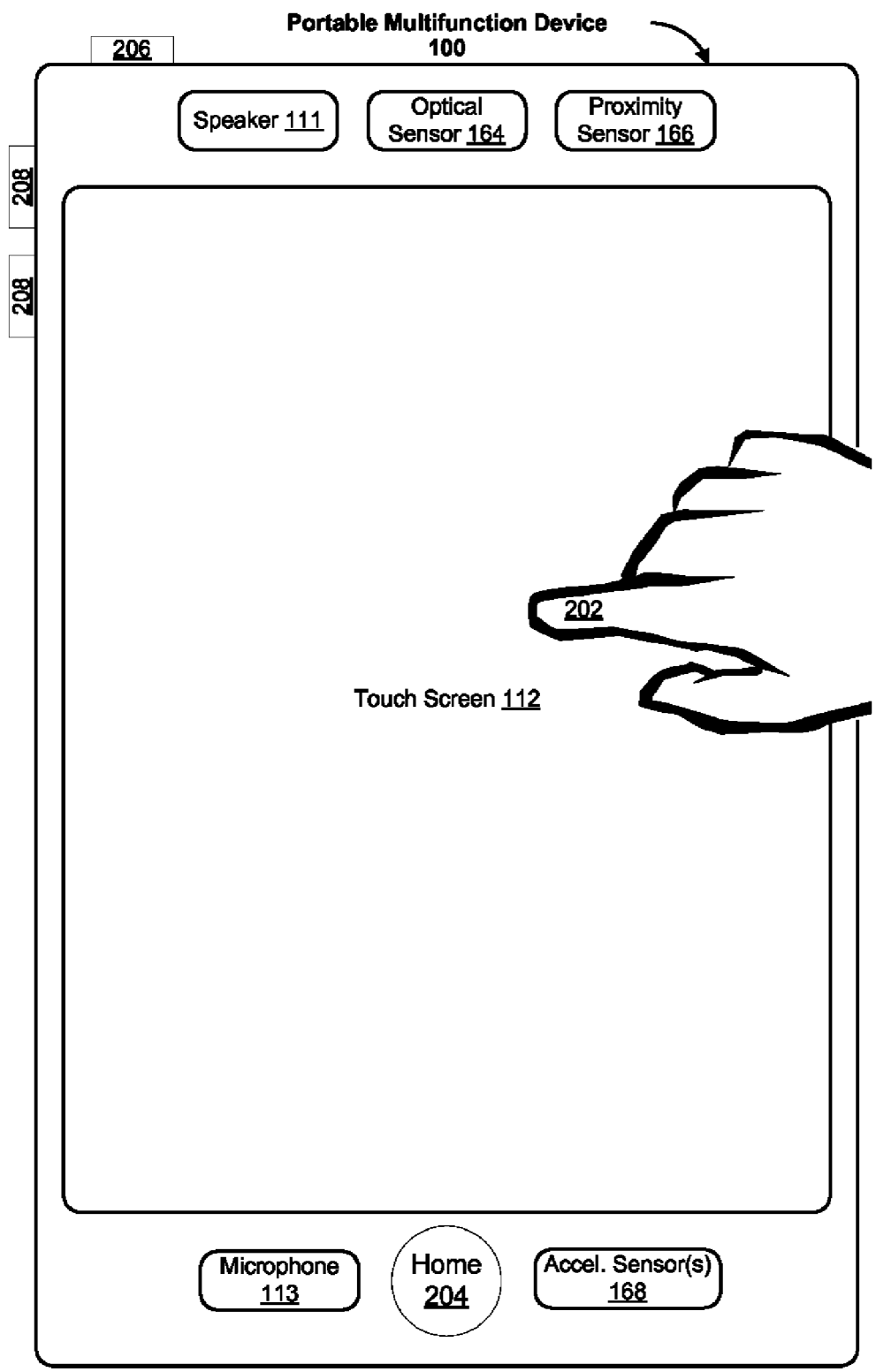
FIG. 2 illustrates a portable multifunction device having a touch screen and one or more dim timers in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the device 100. In some embodiments, inadvertent contact with a graphic may not select the graphic. For example, a swipe gesture with that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113 and it can include an accelerometer 168 to detect user smacks delivered for a variety of purposes.

Attention is now directed towards embodiments of user interfaces ("UI") and associated processes that may be implemented on a portable multifunction device 100.

Figure 3A:
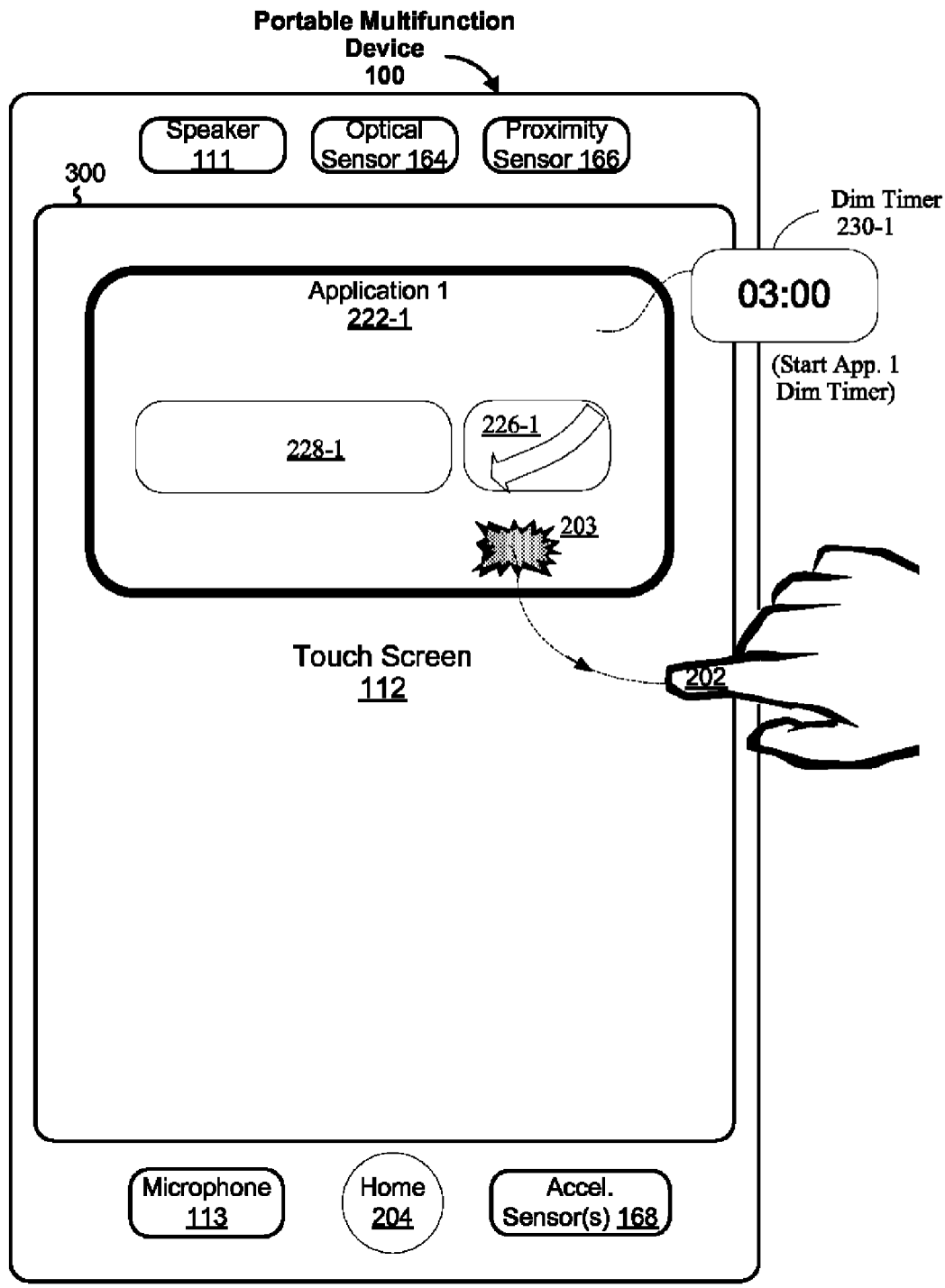
FIGS. 3A-3E illustrate operation of a portable multifunction device having a touch screen and a dim timer in accordance with some embodiments.

FIG. 3A illustrates an exemplary user interface 300 for a portable electronic device that is responsive to user gestures and that implements auto dimming of the display 112 for the device 100 as a whole and/or for individual applications 222 that are open on the display 112. For illustration purposes, the touch screen 112 shows a window for one application 222-1 that includes a text entry area 228 and a button input area 226. The application window 222-1 is active and illuminated (indicated by the bold border of the window 222-1) as it has just been contacted at the location 203 with the user's finger 202. A dim timer 230-1 (corresponding to a dim timer 180 of FIG. 1) is associated with the application 222-1, which starts counting down from an initial value (e.g., 3:00 minutes, which could be a default value or a value set by the user) after the user's finger is withdrawn from the contact location 203. In some embodiments, the dim timer 230-1 could be associated with multiple applications 136, or the device 100 as a whole. Alternatively, in some embodiments, each application 136-*i* could have an associated dim timer 230-*i* that monitors user interaction with that application 136-*i* and potentially determines dimming of that application's respective application window 222-*i*. For illustration purposes, a few of these different embodiments are described herein. Operation of the others should be apparent from these descriptions. Also, a dim timer 230 can count down, or count up, or keep time in any fashion, and can be implemented in hardware or software.

Figure 3B:
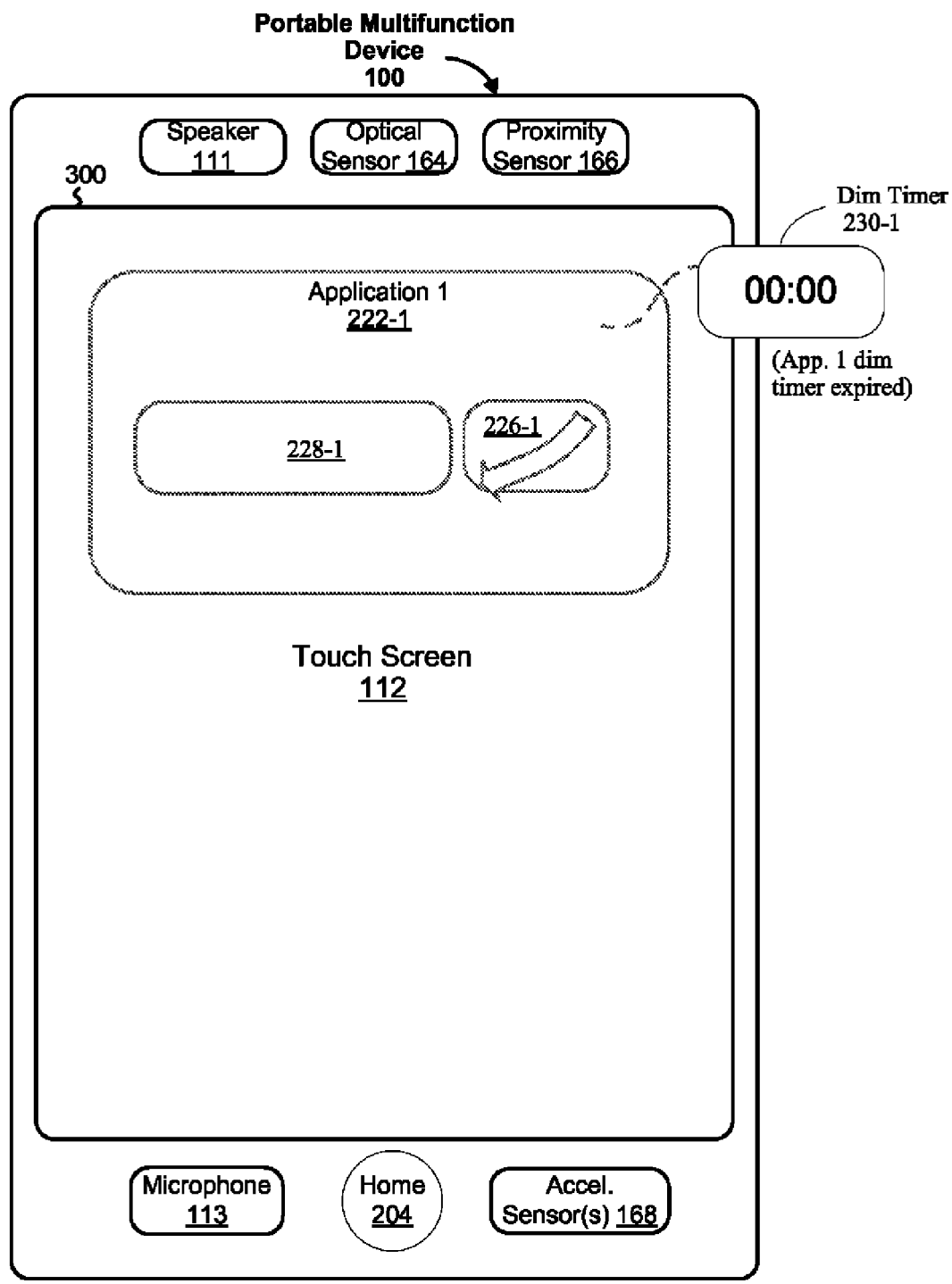

FIG. 3B illustrates the exemplary user interface 300 of FIG. 3A for a time more than 3 minutes following the time illustrated in FIG. 3A. In this figure the countdown timer 230-1 has counted down to 00:00, as a result of which the window 222-1 has been dimmed (shown by the faint border of the window 222-1).

Figure 3C:
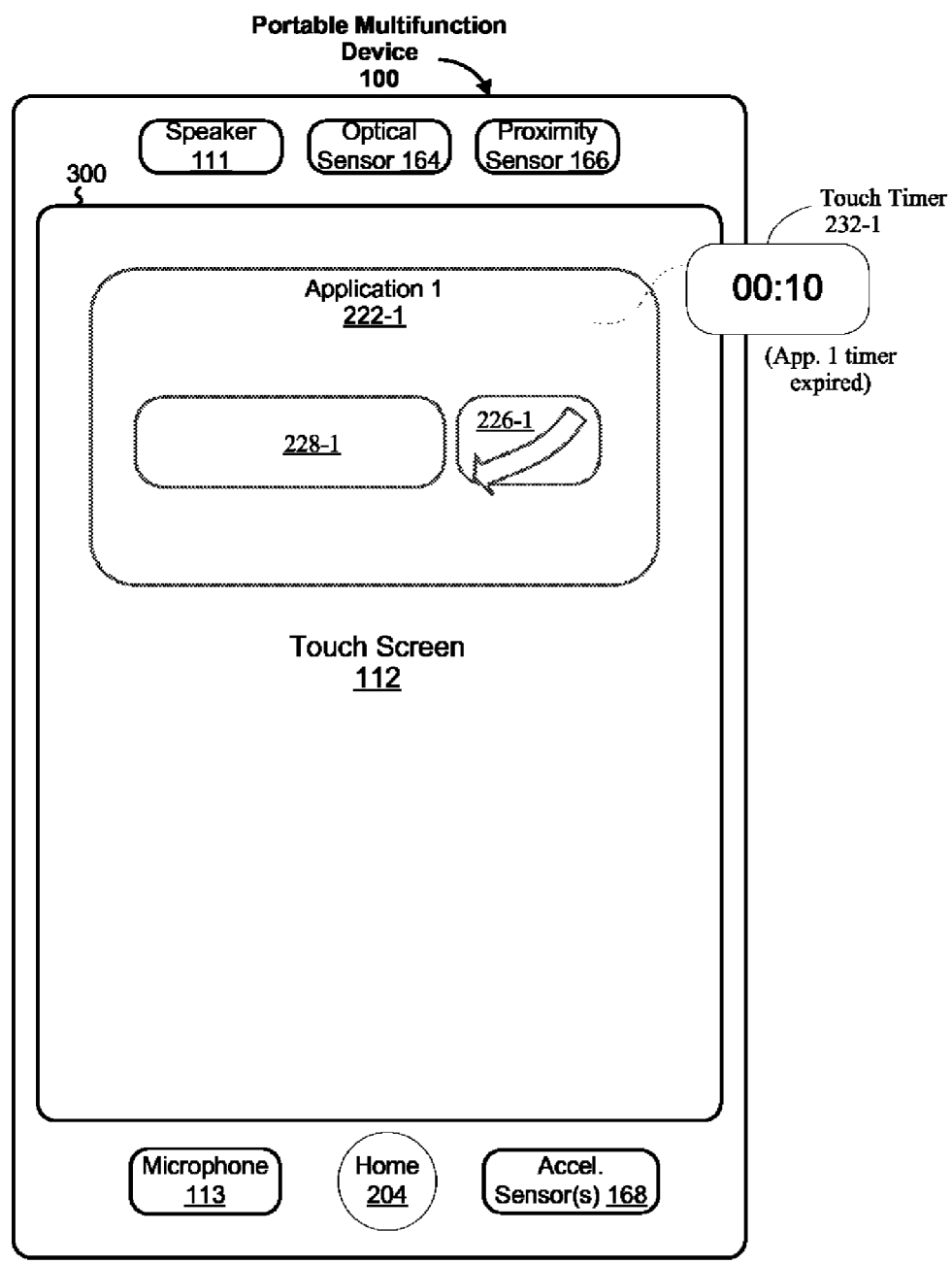

FIG. 3C illustrates the exemplary user interface 300 of FIGS. 3A-3B for a time just following the time illustrated in FIG. 3B. In this figure a touch timer 232-1 associated with the application 222-1 is shown when it is about to start counting down from an initial value of 10 seconds (shown on the timer 232-1 as 00:10). In some embodiments, a touch timer 232 initiates a countdown once the display window associated with its associated application is dimmed. The period during which the touch timer 232 conducts its countdown (and before it stops counting) defines the time during which user interaction of any predefined sort can result in: 1) re-illumination of the display 112 and/or the application window 222, and 2) extension of the auto-dim time in accordance with the present invention. In this illustration, the user is being given 10 seconds to initiate some sort of contact with the device 100, including smacking or shaking the device, to trigger the above-listed illumination and dim time extension effects.

Figure 3D:
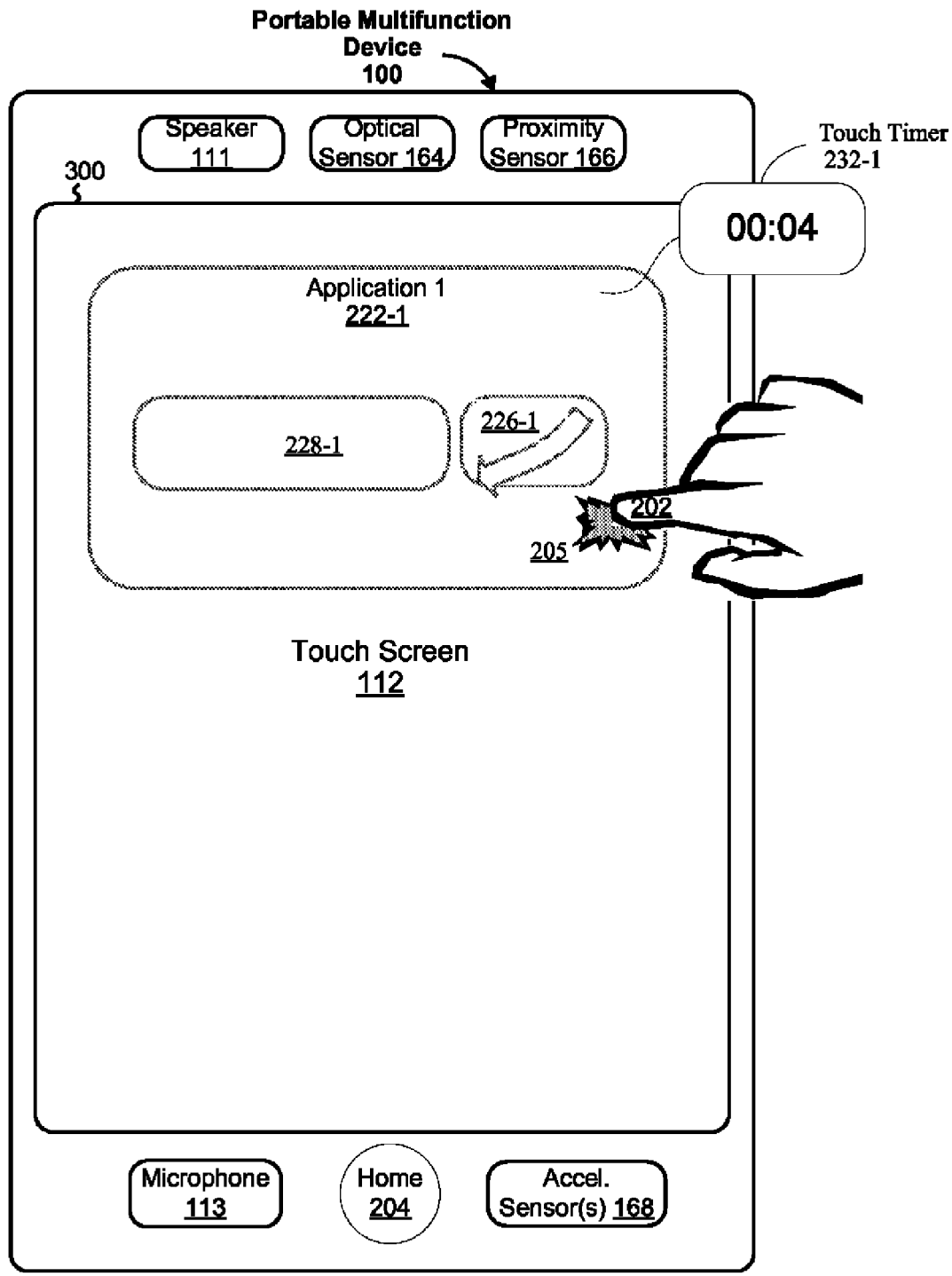

FIG. 3D illustrates the exemplary user interface 300 of FIGS. 3A-3C for a time that is 6 seconds later than the time illustrated in FIG. 3C. In this figure the touch timer 232-1 associated with the application 222-1 has counted down to 4 seconds remaining (00:04) from its initial value of 10 seconds. At this time the user has touched the touch screen display 112 at a contact point 205 with a finger 202.

Figure 3E:
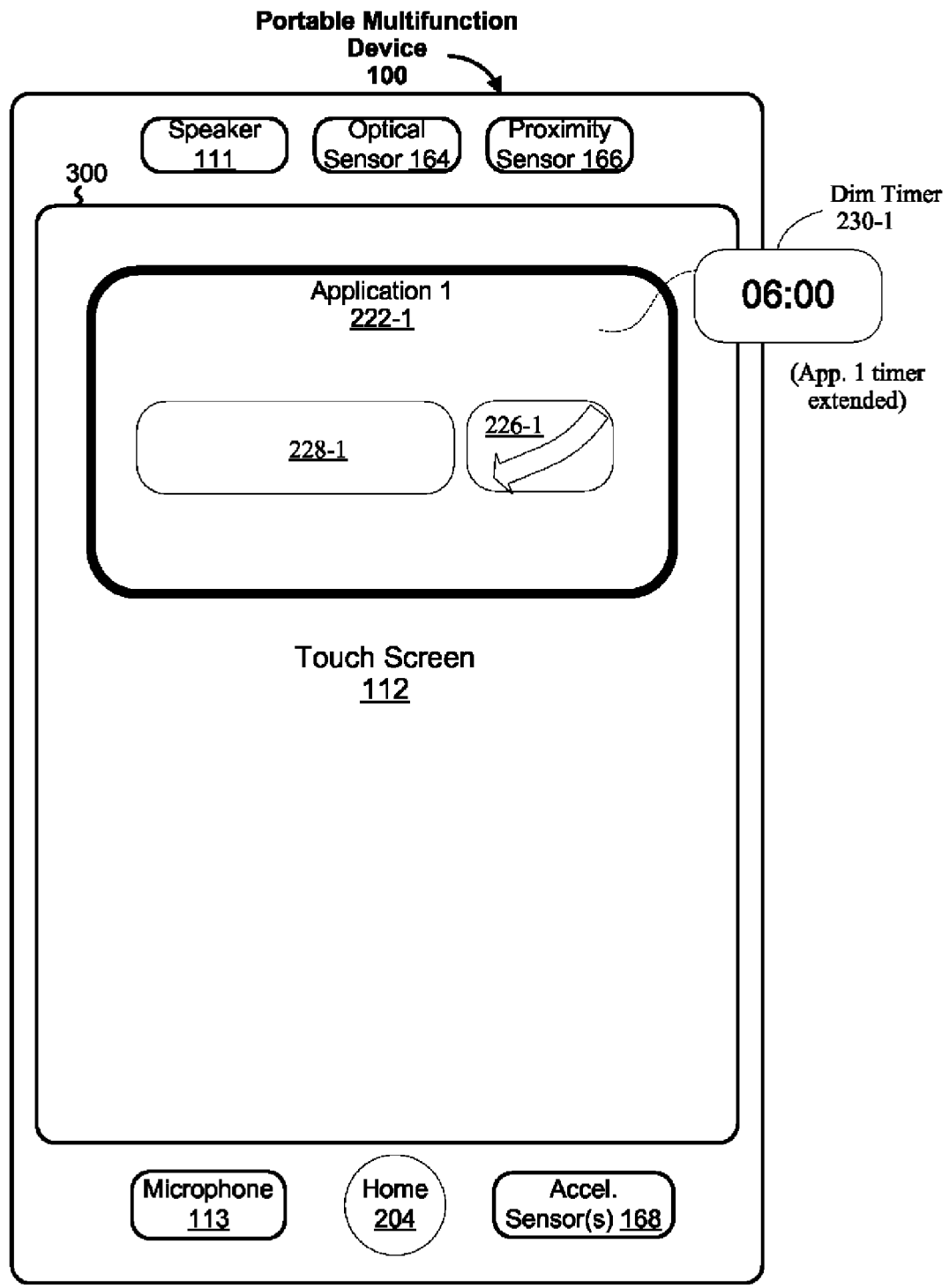

FIG. 3E illustrates the exemplary user interface 300 of FIGS. 3A-3D after the time illustrated in 3D. As a result of the user touching the touch screen display 112 prior to the expiration of the touch timer 232-1, the application window 222-1 is re-illuminated (shown by its bold border) and the dim timer 230-1 initial value has been extended to 6 minutes (shown as 06:00). This allows the user a greater period of inactivity before the screen is dimmed in the future. While the present illustration shows the extended time for the dim timer 230-1 as being twice the initial auto dim time, any degree of extension of the auto dim time initial value is possible, though a device 100 may be programmed to prevent dim times being extended to the point the display 112 could stay illuminated for unreasonably long times.

Figure 4:
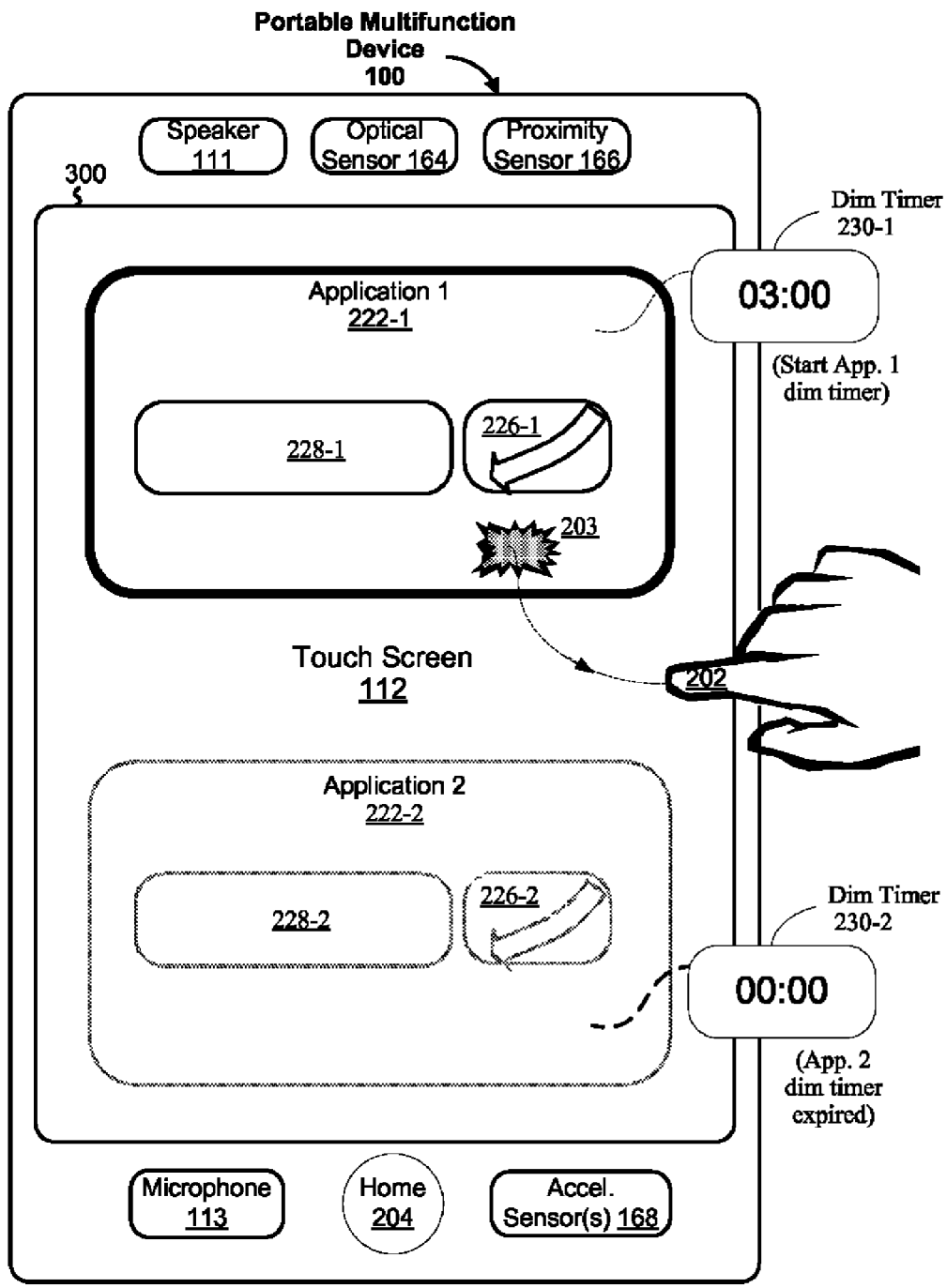
FIG. 4 illustrates operation of a portable multifunction device having a touch screen and multiple dim timers in accordance with some embodiments.

FIG. 4 illustrates an exemplary user interface 300 for a portable electronic device that is responsive to user gestures and that implements auto dimming of the display 112 for individual application windows 222-1 and 222-2, each of which has a respective dim timer 230-1 and corresponding auto dim time values. The application window 222-1 is active and illuminated (indicated by the bold border of the window 222-1) as it has just been touched at the location 203 by the user's finger 202. A dim timer 230-1 associated with the application 222-1 is counting down from its initial value of 3:00 minutes (which could be a default value or a value set by the user) due the withdrawal of the user's finger from the location 203. The window for the application 222-2 is already dimmed (shown by its faint border), presumably because its corresponding dim timer 230-2 expired and the user did not initiate re-illumination of the display 222-2. In this embodiment, if the application 222-1 is dimmed due to an auto dim operation and subsequently re-illuminated due to user interaction with the device 100 while the touch timer 232-1 is counting down, only the application window 222-1 would be re-illuminated and associated with an extended initial auto dim time value. Other application windows, such as application window 222-2, would remain dim and the respective dim time value(s) of the other application window(s) would not be extended. Alternately, in embodiments with individual dim times for respective applications 136, user interaction with any display window results in re-illumination of all active application windows 222 and extension of the auto dim time values associated with all active application windows.

Figure 5A:
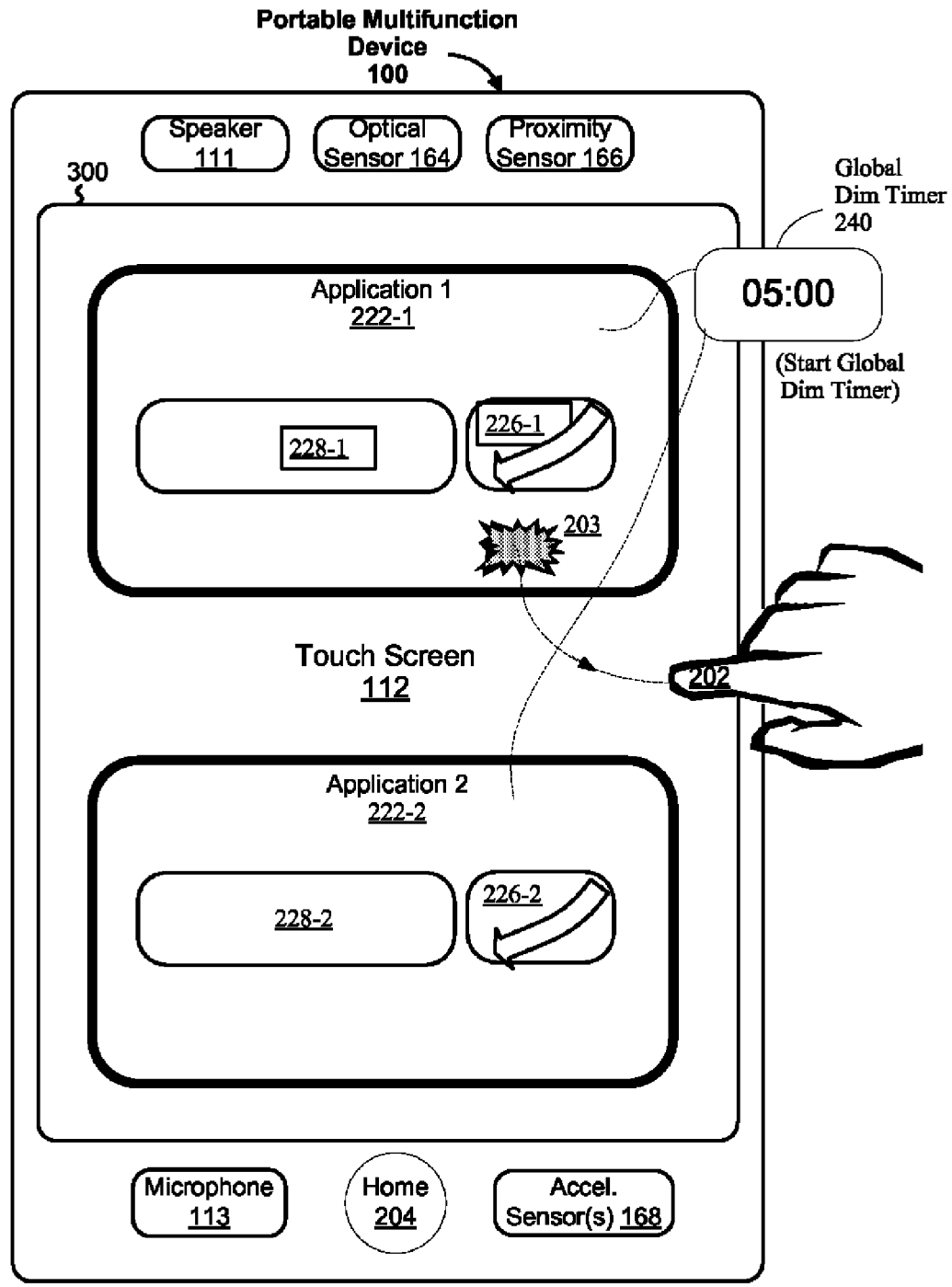
FIGS. 5A-5D illustrates operation of a portable multifunction device having a touch screen and a global dim timer in accordance with some embodiments.

FIG. 5A illustrates an exemplary user interface 300 for a portable electronic device that is responsive to user gestures and that implements auto dimming of the display 112 for multiple application windows 222-1 and 222-2. This embodiment employs a global dim timer 240 that governs dimming and auto dim time extensions for both application windows 222. The application window 222-1 is active and illuminated (indicated by the bold border of the window 222-1) as it has just been touched at the location 203 by the user's finger 202. The application window 222-2 is also illuminated, though it has not been interacted with as recently as the application window 222-1. A global dim timer 240 associated with both applications is about to start counting down from its initial value of 5:00 minutes (which could be a default value or a value set by the user) due the withdrawal of the user's finger from the location 203.

Figure 5B:
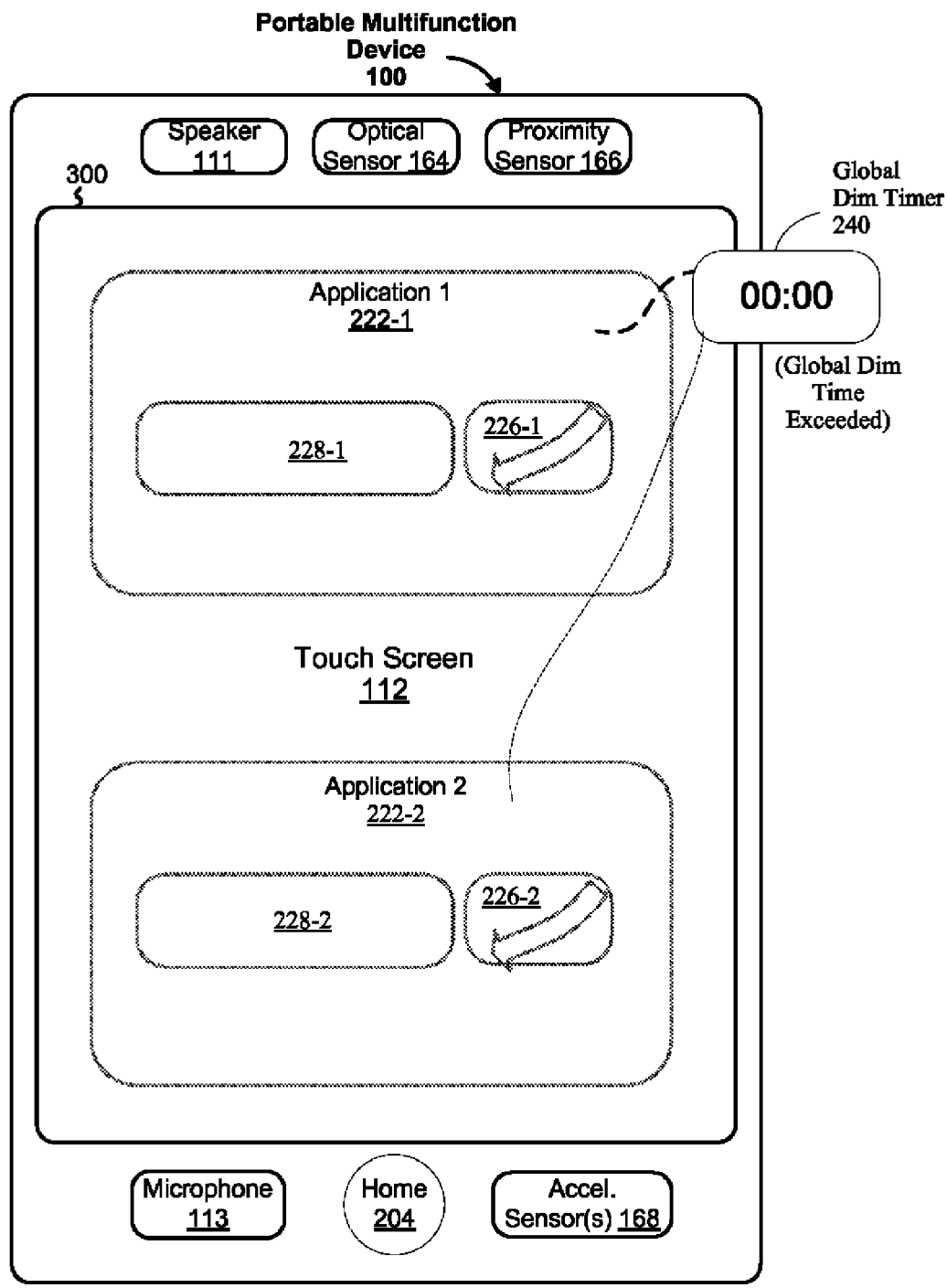

FIG. 5B illustrates the exemplary user interface 300 of FIG. 5A for a time more than 5 minutes following the time illustrated in FIG. 5A. In this figure the global countdown timer 240 has counted down to 00:00, as a result of which the windows 222-1 and 222-2 have both been dimmed (shown by the faint borders of the windows 222-1 and 222-2). Both windows are dimmed at the same time because the applicable auto dim timer is a global dim timer, meaning that is applies to more than a single application 136.

Figure 5C:
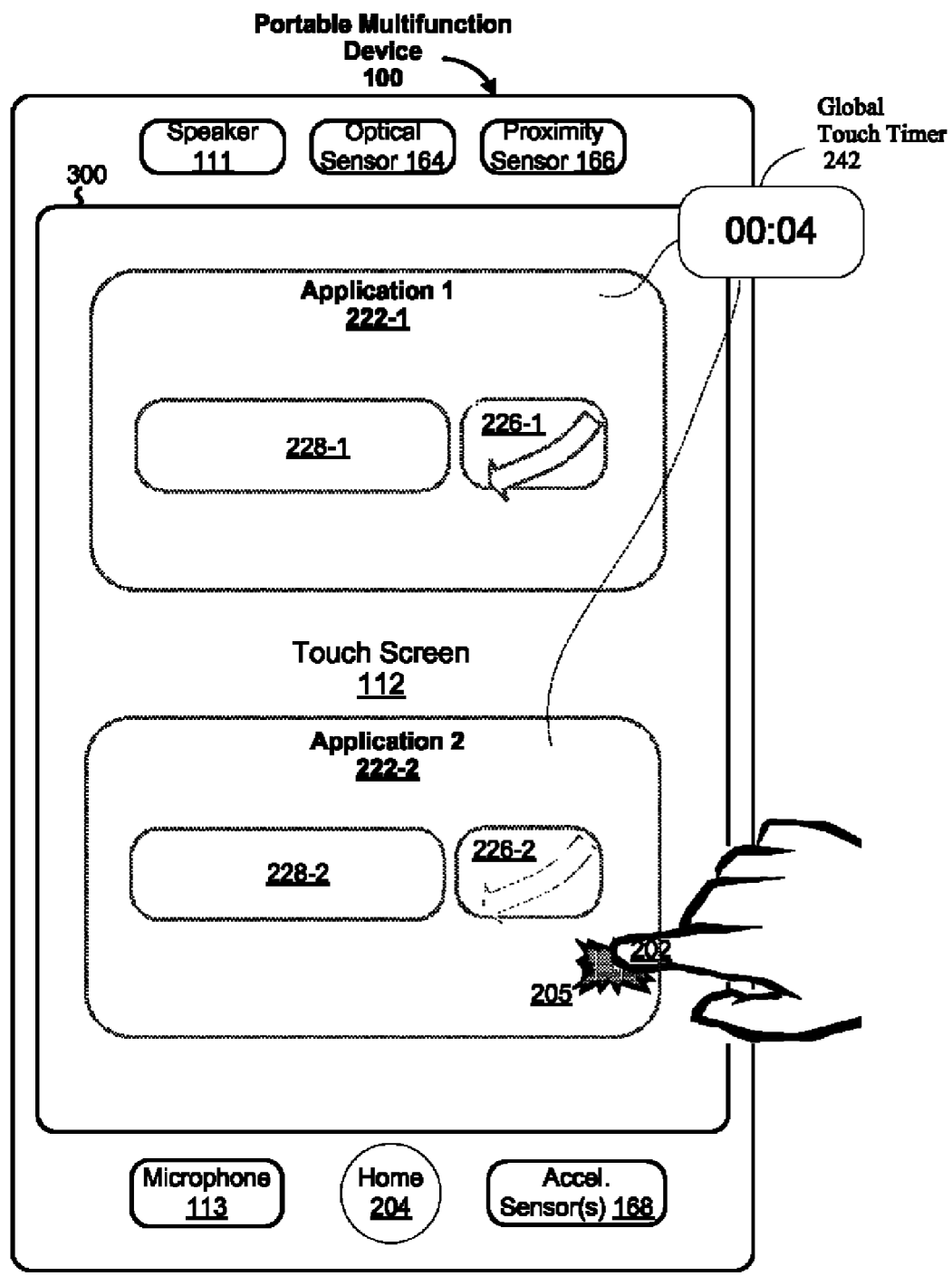

FIG. 5C illustrates the exemplary user interface 300 of FIGS. 5A-5B for a time just following the time illustrated in FIG. 5B. In this figure a global touch timer 242 is shown after it has already counted down from an initial value of 10 seconds to its current value of 4 seconds (shown on the timer 242 as 00:04). At this point the user has touched the application window 222-2 at the contact point 205.

Figure 5D:
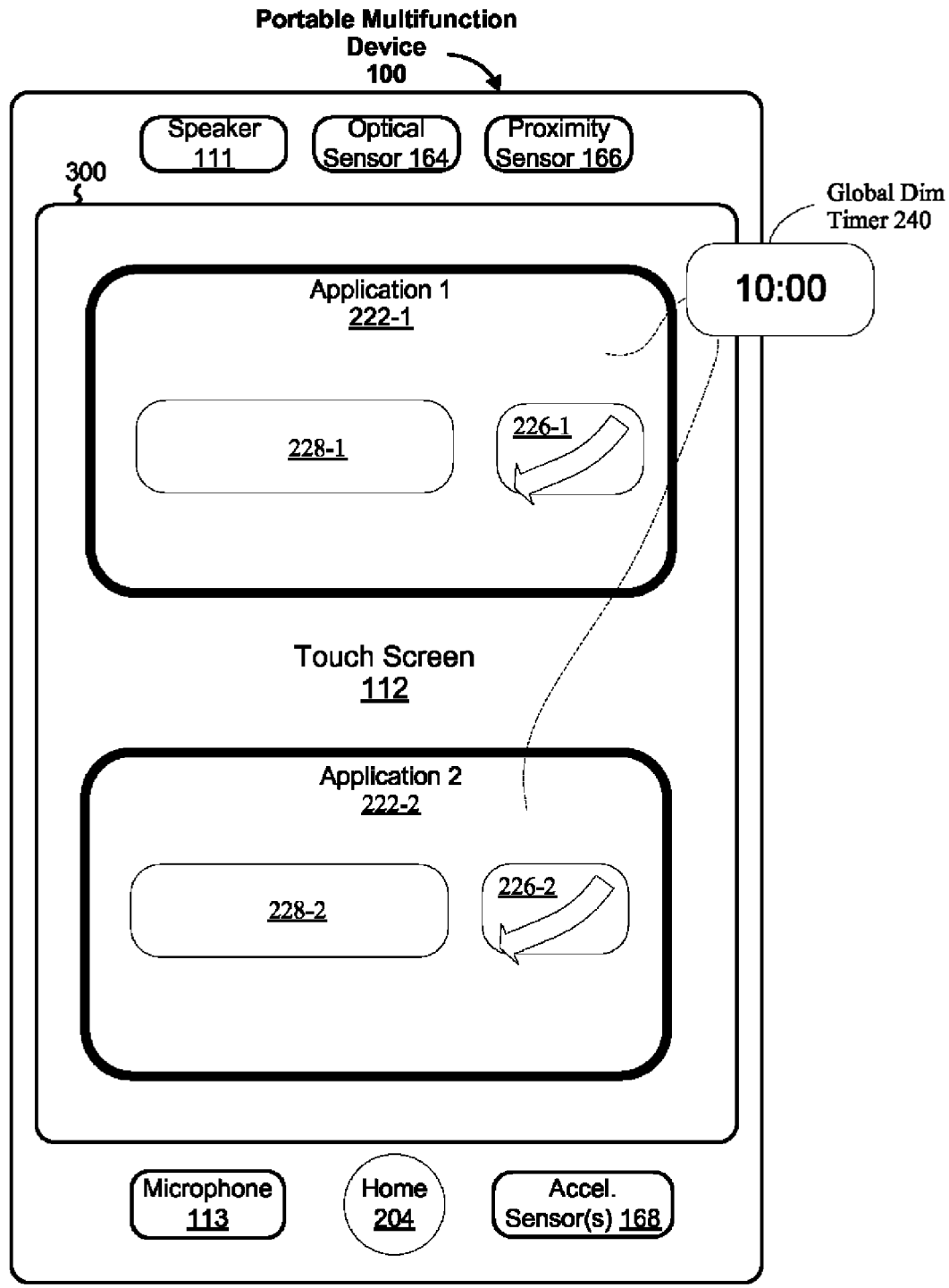

FIG. 5D illustrates the exemplary user interface 300 of FIGS. 5A-5C after the time illustrated in 5C. As a result of the user touching the touch screen display 112 prior to the expiration of the global touch timer 242, both application windows have been re-illuminated (shown by their bold borders) and the initial value of the global dim timer 240 has been extended to 10 minutes (shown as 10:00 on the timer 240).

Figure 6:
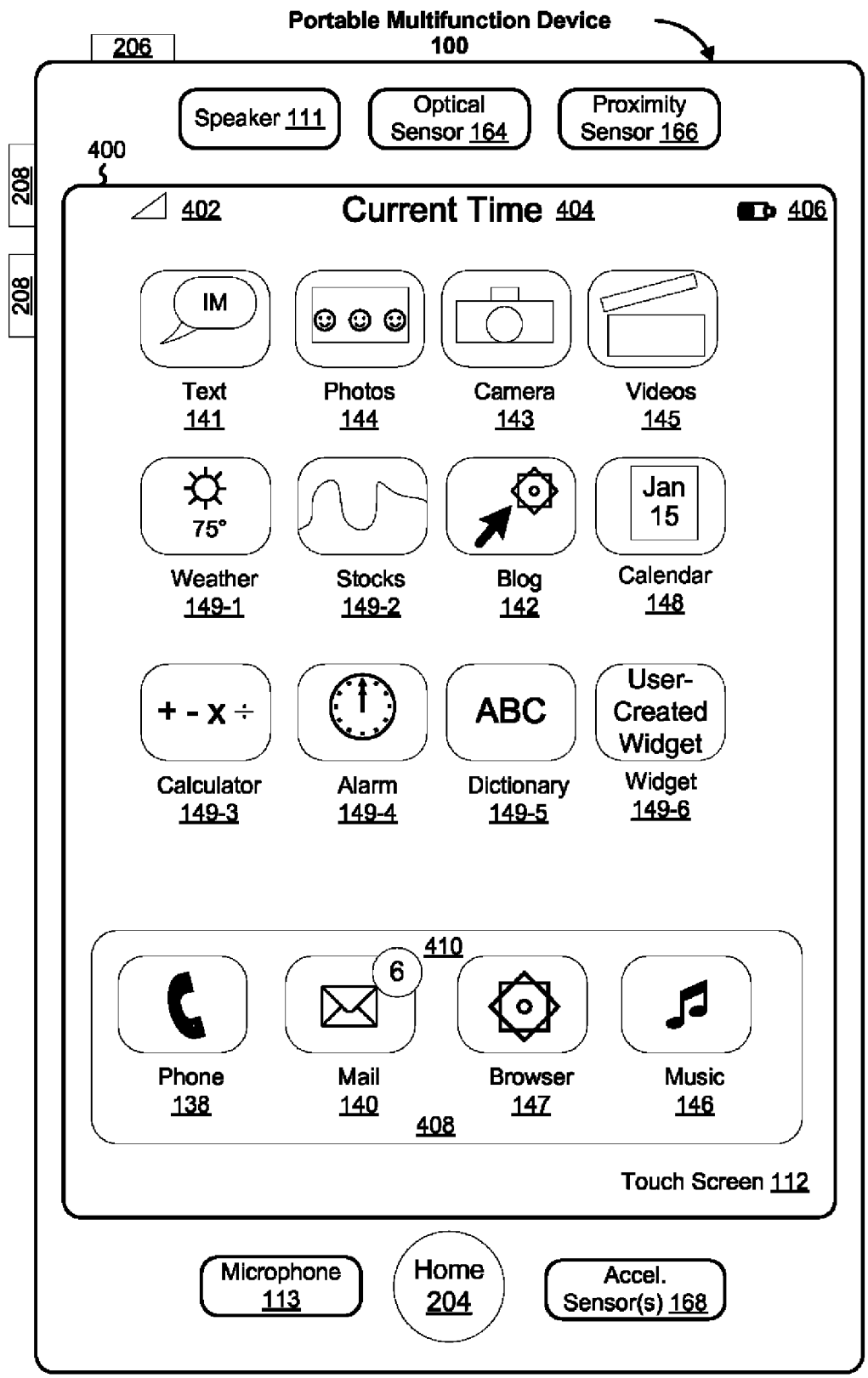
FIG. 6 illustrates an exemplary user interface for a menu of applications on a portable multifunction device in accordance with some embodiments.

FIG. 6 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
   Phone 138;
   E-mail client 140, which may include an indicator 410 of the number of unread e-mails;
   Browser 147; and
   Music player 146; and
Icons for other applications, such as:
   IM 141;
   Image management 144;
   Camera 143;
   Video player 145;
   Weather 149-1;
   Stocks 149-2;
   Blog 142;
   Calendar 148;
   Calculator 149-3;
   Alarm clock 149-4;
   Dictionary 149-5; and
   User-created widget 149-6.

In some embodiments, UI 400 displays all of the available applications 136 on one screen so that there is no need to scroll through a list of applications (e.g., via a scroll bar), or alternately to scroll to one or more additional screens of application icons. In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Each of these applications can have associated auto dim time settings, or can be responsive to global dim time settings. These settings can be accessed from the user interface 402 via predefined user interactions with the touch screen 112 or the buttons 206, 208.

Figure 7A:
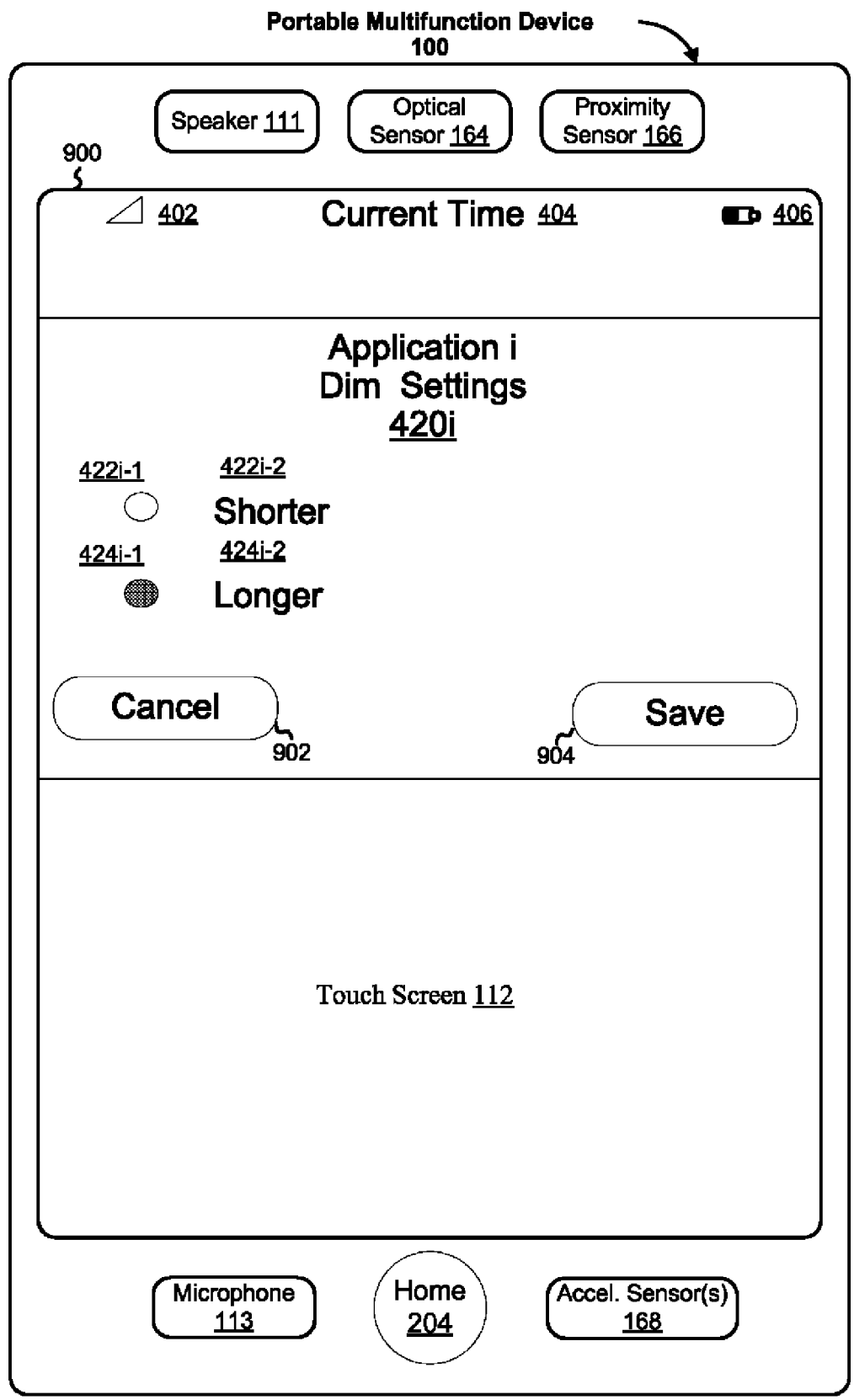
FIG. 7A-7C illustrate an exemplary user interface for a portable multifunction device through which a user can adjust dim timer settings in accordance with some embodiments.

FIG. 7A illustrates an exemplary user interface for updating auto dim time settings 420$i$ for a particular application 136-$i$. In this illustration, the application's auto dim time can be shortened 422$i$-2 or lengthened 424$i$-2 from its current value using the radio buttons 422$i$-1 and 424$i$-1. Alternative methods of modifying the auto dim times are also possible, including allowing the user to select from among multiple predefined values with a pull-down menu, or allowing the user to input values directly using a text box.

Figure 7B:
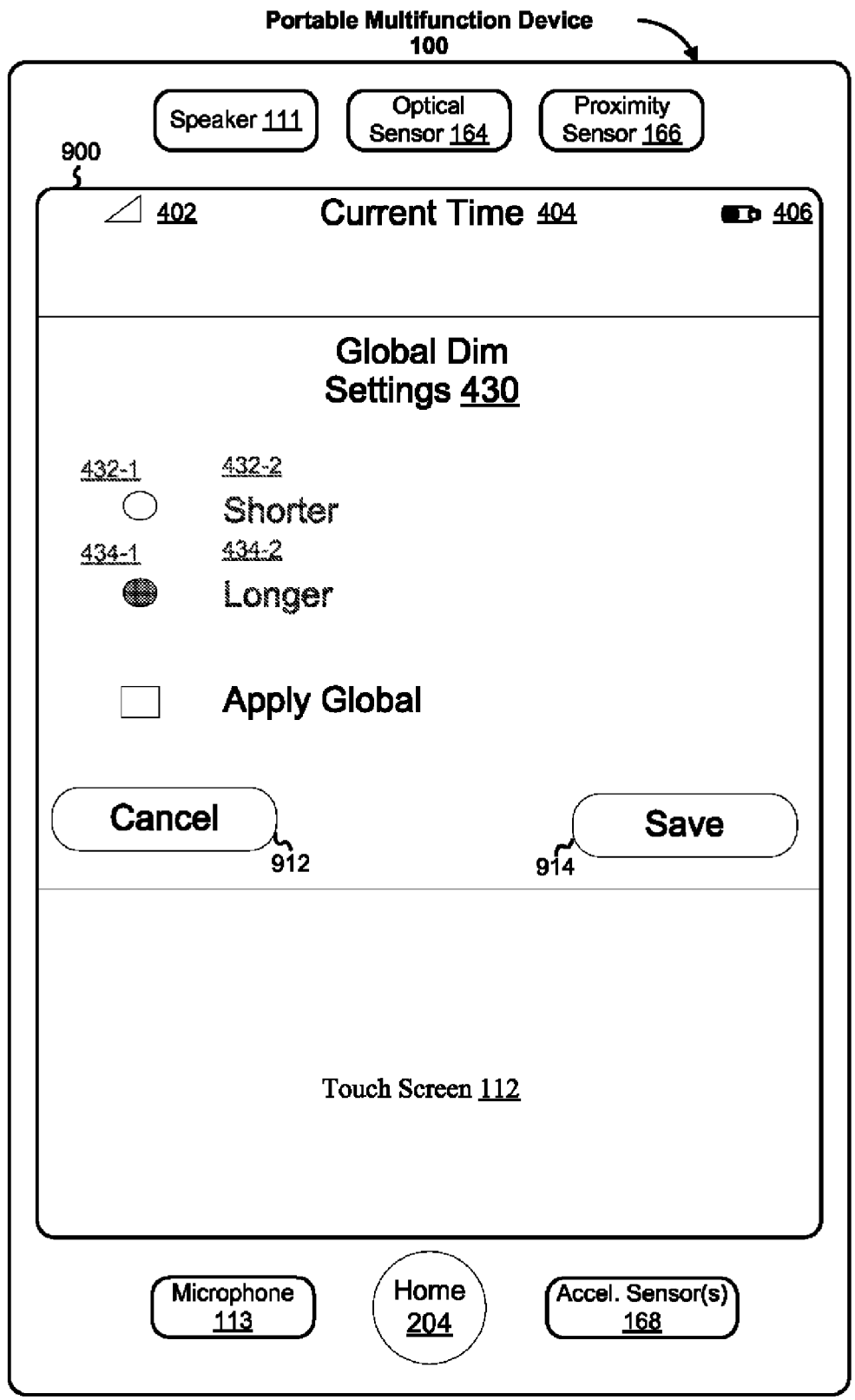

FIG. 7B illustrates an exemplary user interface for updating global auto dim time settings 430 for the device 100. In this illustration the global dim settings 430 are enabled when the "Apply Global" check box is selected. In some embodiments, if the global auto dim time function is enabled, the global settings take precedence over auto dim times for individual applications. In this illustration, the global auto dim time function has not been checked/enabled, so the individual application dim times are operative. As described in reference to FIG. 7A, the global auto dim time setting can adjusted with the radio buttons 432-1 and 434-1 to a shorter 432-2 or longer value 434-2 than the current value. Because the global dim time function is not enabled in this illustration, the radio button choices are shown grayed out, meaning that they are not available in the current system state.

Figure 7C:
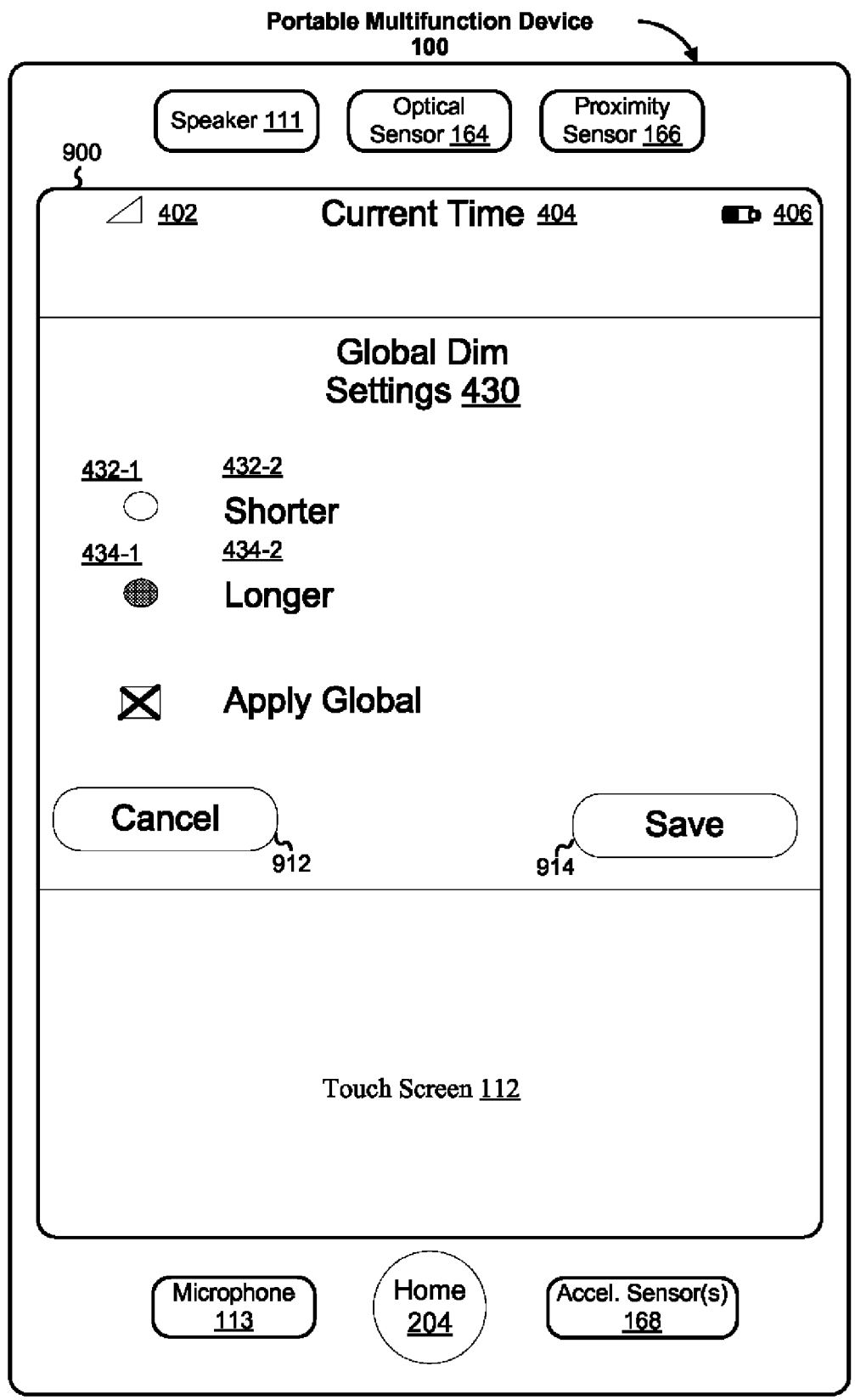

FIG. 7C illustrates an exemplary user interface for updating global auto dim time settings 430 for the device 100. In this illustration the global dim settings 430 are enabled and, as a result, the radio button choices are not shown grayed out, meaning that they are available in the current system state.

Figure 8:
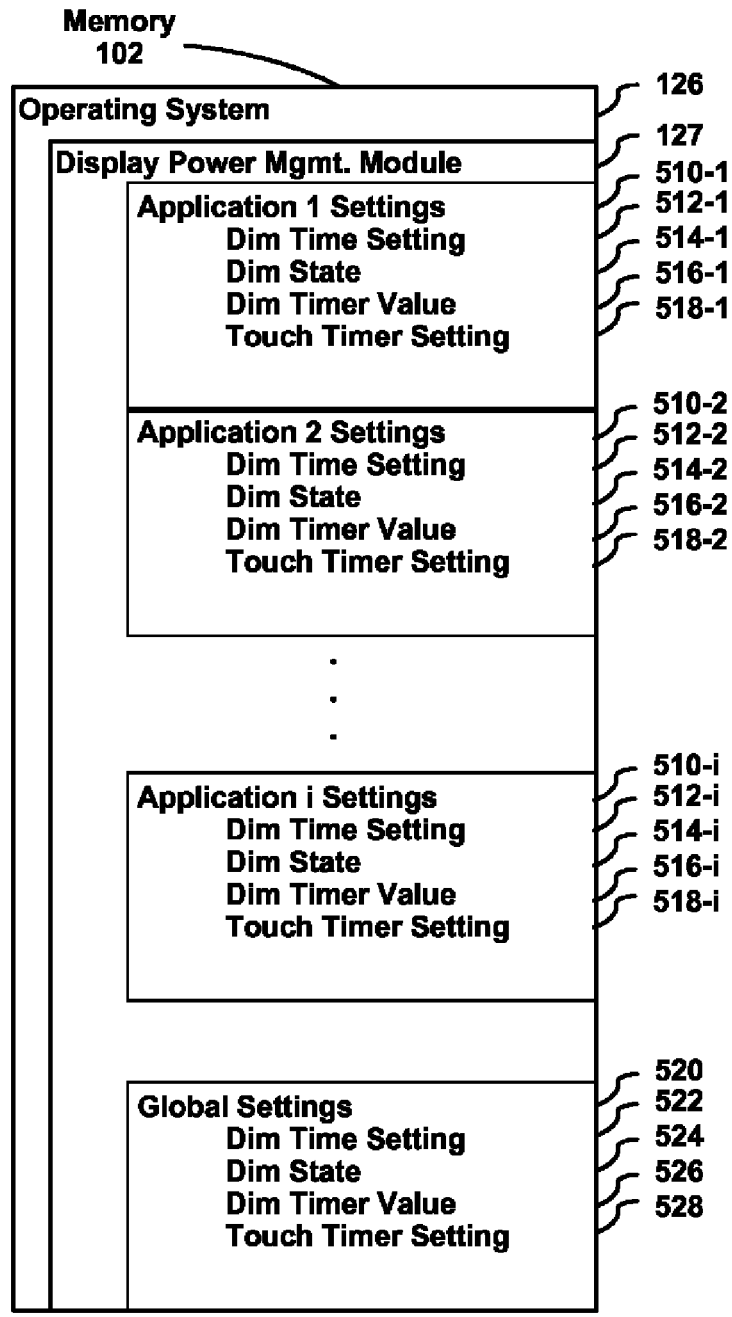
FIG. 8 is a block diagram illustrating functions of the portable multifunction device related to user interaction with the device to extend display dim times in accordance with some embodiments.

FIG. 8 shows a detailed block diagram of the memory 102 that illustrates data structures related to the display power management module 127 for some embodiments. The display power management module 127 stores, manages and updates parameters associated with auto dim timer operations for individual applications, and global dim time operations. In some embodiments, for individual applications 136-$i$ the dim time parameters 510-$i$ stored in the memory include a dim time setting 512-$i$ (the initial time setting for an auto dim timer), a dim state 514-$i$ (indicating a variety of dim timer states, including, but not limited to: expired, active, or disabled—when the global dim timer is operative, for example), dim timer value 516-$i$ (the current value of a dim timer while it is counting) and a touch timer setting 518-$i$ (the initial time setting for an touch timer). Other possible values that might stored include default settings for the various timers, and any other parameters or variables that are required by the display power management module to manage the auto dim functions, and other display power management functions, associated with the device 100.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable electronic device having a display:
        executing on the device a first application with a first auto dim time setting and first display window, and a second application with a second auto dim time setting that is independent of the first auto dim time and a second display window;
        if the first display window is active, dimming the first display window when there is no user interaction with the first application for a period of time in excess of the first auto dim time setting, and if there is subsequent user interaction with the device to reverse the dimming within a predefined time of the dimming, reversing the dimming of the first display window and extending the first auto dim time setting; and
        if the second display window is active, dimming the second display window when there is no user interaction with the second application for a period of time in excess of the second auto dim time setting, and if there is subsequent user interaction with the device to reverse the dimming within a predefined time of the dimming, reversing the dimming of the second display window and extending the second auto dim time setting.

2. The method of claim 1, wherein extending the first auto dim time setting comprises substantially doubling the first auto dim time setting.

3. A computer readable storage medium storing one or more programs for execution by a portable electronic device having a display, the one or more programs including instructions for:
    executing on the device a first application with a first auto dim time setting and first display window, and a second application with a second auto dim time setting that is independent of the first auto dim time and a second display window;
    if the first display window is active, dimming the first display window when there is no user interaction with the first application for a period of time in excess of the first auto dim time setting, and if there is subsequent user interaction with the device to reverse the dimming within a predefined time of the dimming, reversing the dimming of the first display window and extending the first auto dim time setting; and
    if the second display window is active, dimming the second display window when there is no user interaction with the second application for a period of time in excess of the second auto dim time setting, and if there is subsequent user interaction with the device to reverse the dimming within a predefined time of the dimming, reversing the dimming of the second display window and extending the second auto dim time setting.

4. The computer readable storage medium of claim 3, wherein extending the first auto dim time setting comprises substantially doubling the first auto dim time setting.

5. A portable electronic device, comprising:
    a display;
    one or more processors for executing computer programs; and
    memory storing one or more programs for execution by the one or more processors of the portable electronic device, the one or more programs comprising instructions for:
        executing on the device a first application with a first auto dim time setting and first display window, and a second application with a second auto dim time setting that is independent of the first auto dim time and a second display window;
        if the first display window is active, dimming the first display window when there is no user interaction with the first application for a period of time in excess of the first auto dim time setting, and if there is subsequent user interaction with the device to reverse the dimming within a predefined time of the dimming, reversing the dimming of the first display window and extending the first auto dim time setting; and
        if the second display window is active, dimming the second display window when there is no user interaction with the second application for a period of time in excess of the second auto dim time setting, and if there is subsequent user interaction with the device to reverse the dimming within a predefined time of the dimming, reversing the dimming of the second display window and extending the second auto dim time setting.

6. The portable electronic device of claim 5, wherein extending the first auto dim time setting comprises substantially doubling the first auto dim time setting.

* * * * *